Aug. 29, 1967  H. A. McMASTER ETAL  3,338,697
GASEOUS SUPPORT BED FOR CONVEYING AND HEAT
TREATING GLASS SHEETS
Original Filed Nov. 29, 1963  5 Sheets-Sheet 1

INVENTORS
Harold A. McMaster,
BY & Norman C. Nitschke

Barnard, McGlynn & Rising
ATTORNEYS

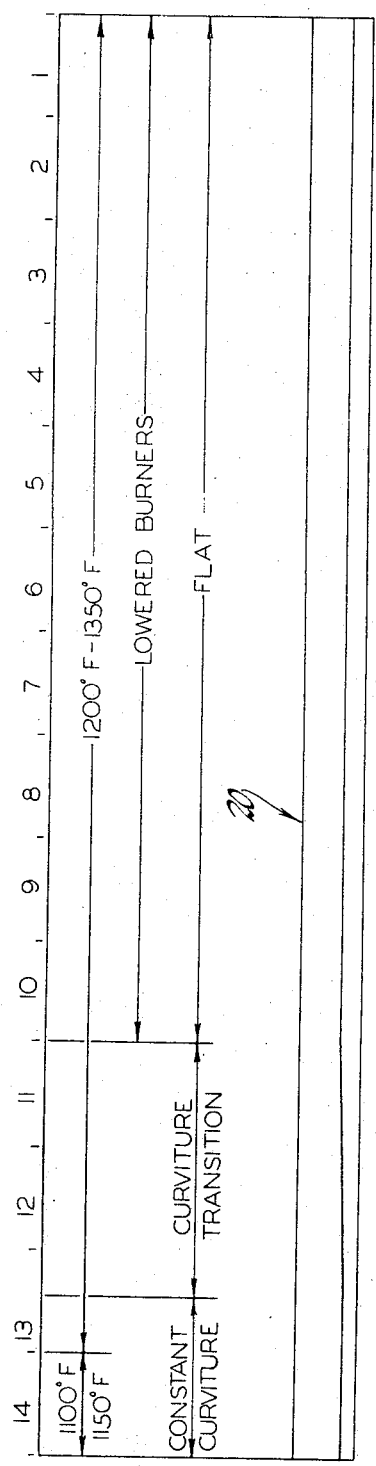
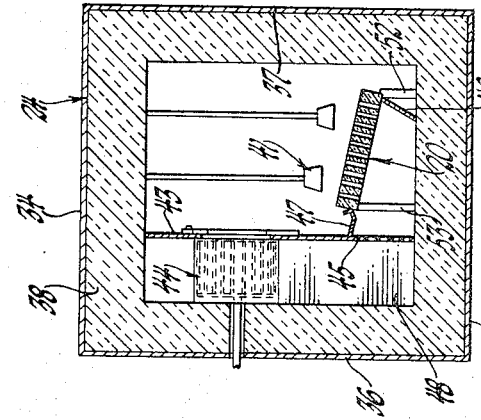
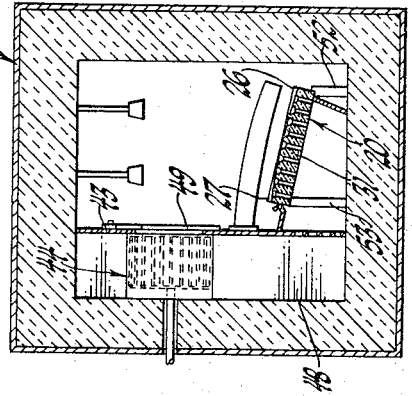
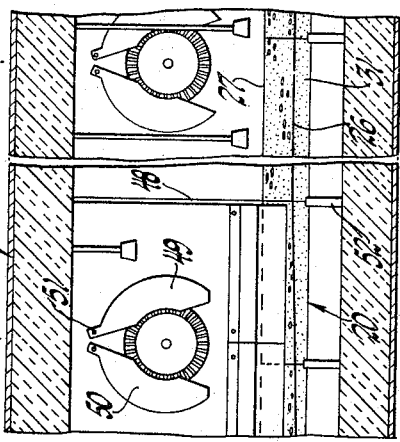

Aug. 29, 1967  H. A. McMASTER ETAL  3,338,697
GASEOUS SUPPORT BED FOR CONVEYING AND HEAT
TREATING GLASS SHEETS
Original Filed Nov. 29, 1963  5 Sheets-Sheet 3
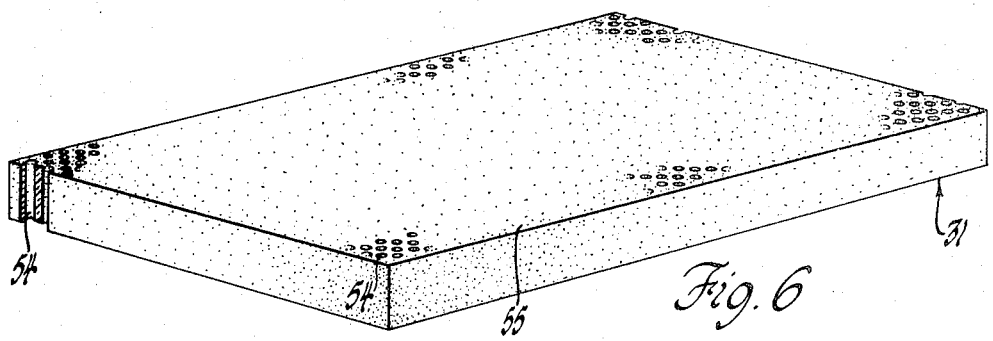
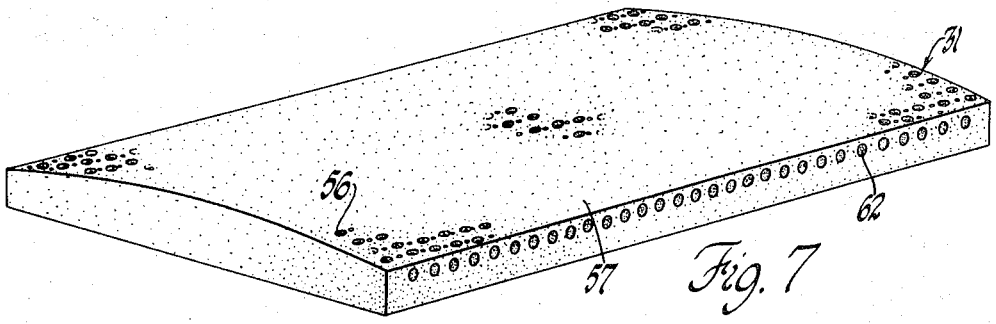
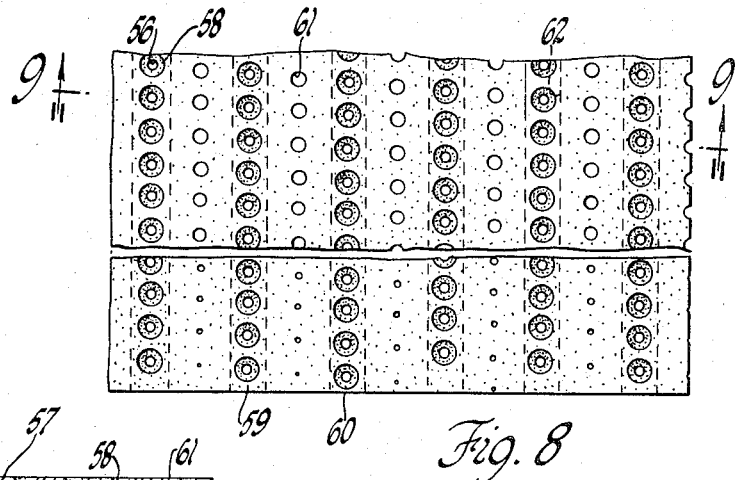
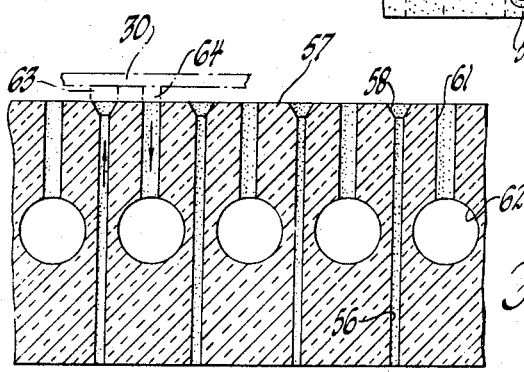
INVENTORS
Harold A. McMaster,
BY & Norman C. Nitschke
Barnard, McGlynn & Reising
ATTORNEYS

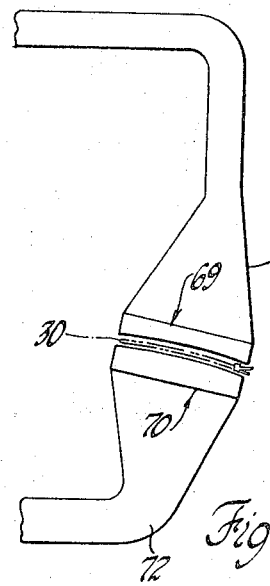
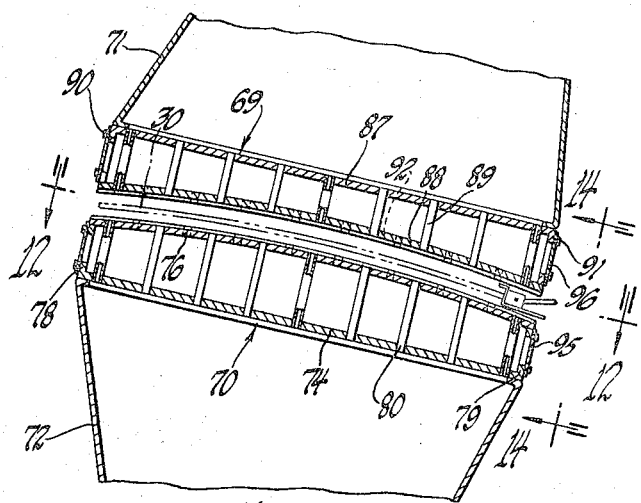
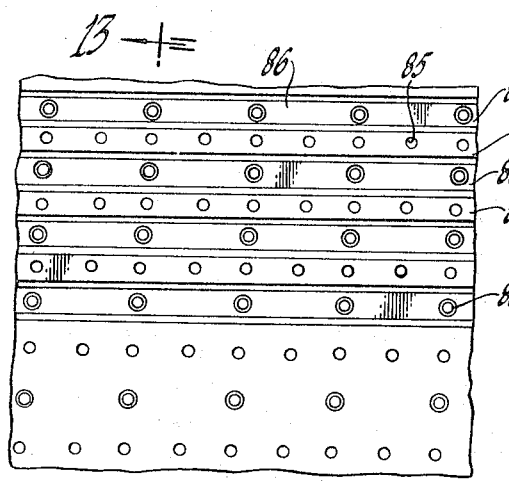
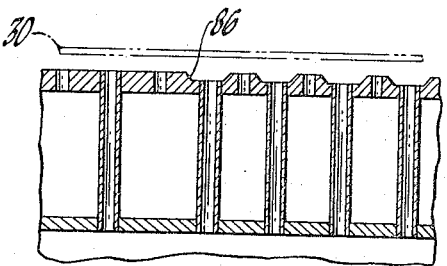
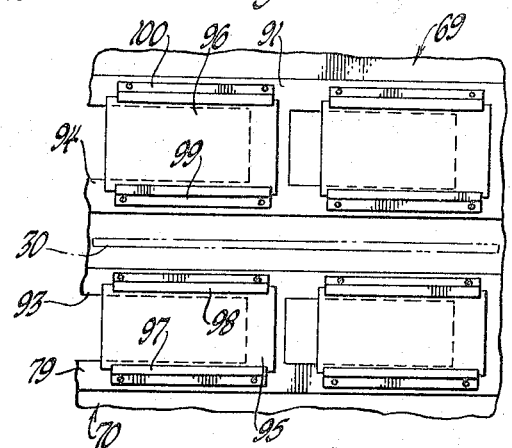

INVENTORS
Harold A. McMaster;
& Norman C. Nitschke

Barnard, McGlynn & Leising
ATTORNEYS

United States Patent Office 3,338,697
Patented Aug. 29, 1967

3,338,697
GASEOUS SUPPORT BED FOR CONVEYING AND HEAT TREATING GLASS SHEETS
Harold A. McMaster, Woodville, and Norman C. Nitschke, Perrysburg, Ohio, assignors to Permaglass, Inc., Woodville, Ohio, a corporation of Ohio
Original application Nov. 29, 1963, Ser. No. 326,713. Divided and this application Sept. 15, 1966, Ser. No. 579,628
12 Claims. (Cl. 65—182)

ABSTRACT OF THE DISCLOSURE

The instant invention relates to an integral ceramic block to form a bed in a glass treating furnace where sheets of glass are floated on fluid over the bed while being treated and, more specifically, to such a block including first and second surfaces interconnected by a plurality of sides with a first plurality of passages extending through the interior of the block, a second plurality of passages extending completely through the block between the sides thereof and a third plurality of passages extending into the block from the first surface and communicating with the second plurality of passages so that fluid may pass through the first plurality of passages to the first surface, laterally over the first surface, and out through the second and third plurality of passages to the sides of the block.

This application is a division of application Ser. No. 326,713, filed Nov. 29, 1963, in the names of Harold A. McMaster and Norman C. Nitschke and assigned to the assignee of the instant invention.

In recent years there has been a greatly increased demand for curved glass sheets or plates for use as automobile windows, protective windows for television screens, architectural glass, etc. Also, there has been ever increasing recognition of the advantages of tempered glass, particularly its high strength and safety features. Currently, the big demand is for windows of relatively thin tempered curved glass. To manufacture tempered glass it is necessary that the individual glass pieces first be cut and to the particular shape desired and then tempered. Hence, to manufacture curved tempered glass automobile windows or the like, the essential sequence of steps is (1) form an untempered glass sheet to proper size, with edges rounded and polished as desired, (2) heat and bend the sheet to the curvature required, and (3) rapidly and uniformly cool the curved sheet to provide the temper.

The stock method for bending a glass sheet to curved or bowed configuration is to heat the glass sheet to its softening temperature and then press or allow it to sag under gravity against a mold having the curved or bowed shape desired. Flat glass is suspended on tongs or racks during the heating process. However, these methods have serious disadvantages, perhaps the chief of which is that of marring of the glass, particularly at the edges thereof, by contact with the mold or tongs. This is particularly a problem for the manufacture of tempered glass since, once tempered, surface imperfections cannot be easily corrected. Another serious disadvantage of these methods is that they are inherently ill suited to large scale production since the glass pieces must be made one at a time rather than on a continuous basis. The solution proposed by the prior art for the marring problem is to provide a cushion of gas between the softened glass surface and the mold. Numerous patents show this concept or variations thereof, U.S. Patent 2,395,727, Devol, being typical. Various other prior patents teach that a gas film support is not only useful to prevent marring but also as a substantially friction-free means for conveying heat softened glass sheets over a bed. Exemplary of such prior teachings are U.S. Patent 1,591,179, Myers; 1,622,817, Waldron; 1,821,375, Brancart; and 2,505,103, Devol. This suggests then that to form curved glass sheets on a continuous high production basis, it is only necessary to heat and float the sheets on a film of hot gas across a bed which provides the precise curvature desired. In practice, however, such method presents numerous problems, particularly as regards the manufacture of high quality tempered glass sheets. One problem, for example, is that of attaining the almost perfect uniformity of heating of the glass sheets which is required in order to attain the desired curvature but without localized distortion to the glass surface. Another problem is that of preventing any contact of the glass sheets with the support bed, particularly in that zone on the bed where the glass changes from flat to curved shape. It is in this transition zone where contact is most likely to occur. Another problem is that of transporting or guiding the softened sheets across the bed without at the same time causing marring or distortion of the glass because of contact with the guide or transport means. Another problem perculiar to the manufacture of tempered glass is that of attaining a uniform temperature prior to tempering and optimum uniformity in cooling during tempering to prevent warpage or shattering. A further problem which is extremely important from the practical standpoint is that of accomplishing such an apparatus which can be constructed, operated, and maintained at relatively low cost. The chief difficulty here is that the furnace bed on which the glass sheets float must inherently be of considerable length and must operate at high temperature, sufficient to soften the glass. This leads to thermal expansion problems and attendant stresses and distortions in the support bed. Any such distortions are, of course, a serious impairment since the attainment of an accurate, controlled glass surface, be it curved or flat, is dependent upon perfect accuracy of the bed surface. Additionally, distortion in the bed can result in non-uniform flotation of the sheets and resultant contact between the sheets and the bed causing marring of the glass. These, then, are some of the more serious difficulties which must be solved in order to provide an efficient, relatively low-cost apparatus for manufacturing tempered glass sheets, and particularly curved tempered sheets, by a method wherein the sheets are heat softened while being gas floated over a bed which is shaped to provide the desired contour. The present invention solves these difficulties.

Hence, it is a principal object of the present invention to provide an improved method and apparatus for manufacturing sheets of glass or the like efficiently and at relatively low cost. More specifically, it is an object of the invention to provide a glass manufacturing apparatus of the type described whereby tempered curved glass sheets of exceptionally high quality can be manufactured on a continuous high production basis at relatively low cost with very low scrap or breakage losses. These along with other objects, features and advantages of the invention will appear more clearly from the following detailed description of a preferred embodiment thereof made with reference to the drawings in which:

FIGURE 2 is a schematic elevational view within the furnace to show the contour of the bed and the various furnace zones;

FIGURE 3 is a partial longitudinal cross sectional view of the furnace of FIGURES 1 and 2 illustrating the position of the various parts in various zones;

FIGURE 4 is a transverse cross sectional view of the furnace of FIGURE 1 taken substantially along the line 4—4 of FIGURE 3 and looking in the direction of the arrows;

FIGURE 5 is another transverse cross sectional view of the furnace of FIGURE 1 taken substantially along the line 5—5 of FIGURE 3 and looking in the direction of the arrows;

FIGURE 6 is a perspective view of a portion of the bed wherein the bed contour is flat;

FIGURE 7 is a perspective view of another portion of the bed illustrating the position of the inlet and exhaust openings therein;

FIGURE 8 is a plan view of the portion of the bed illustrated in FIGURE 7 showing the position of the inlet and outlet passages;

FIGURE 9 is a cross-sectional view of the bed portion of FIGURE 7 taken substantially along the line 9—9 of FIGURE 8 and looking in the direction of the arrows;

FIGURE 10 is a transverse cross sectional schematic view of the blasthead at the end of the furnace illustrated in FIGURE 1;

FIGURE 11 is an enlarged cross sectional view of the portion of the blasthead illustrating the construction of the upper and lower blasthead beds;

FIGURE 12 is a plan view of a portion of the blasthead lower bed taken substantially along the line 12—12 of FIGURE 11 and looking in the direction of the arrows;

FIGURE 13 is an enlarged longitudinal cross sectional view of a portion of the blasthead lower bed taken substantially along the line 13—13 of FIGURE 12 and looking in the direction of the arrows;

FIGURE 14 is a side view of a portion of the upper and lower blasthead beds taken substantially along the line 14—14 of FIGURE 11 to illustrate the flow regulation means;

Figure 1:
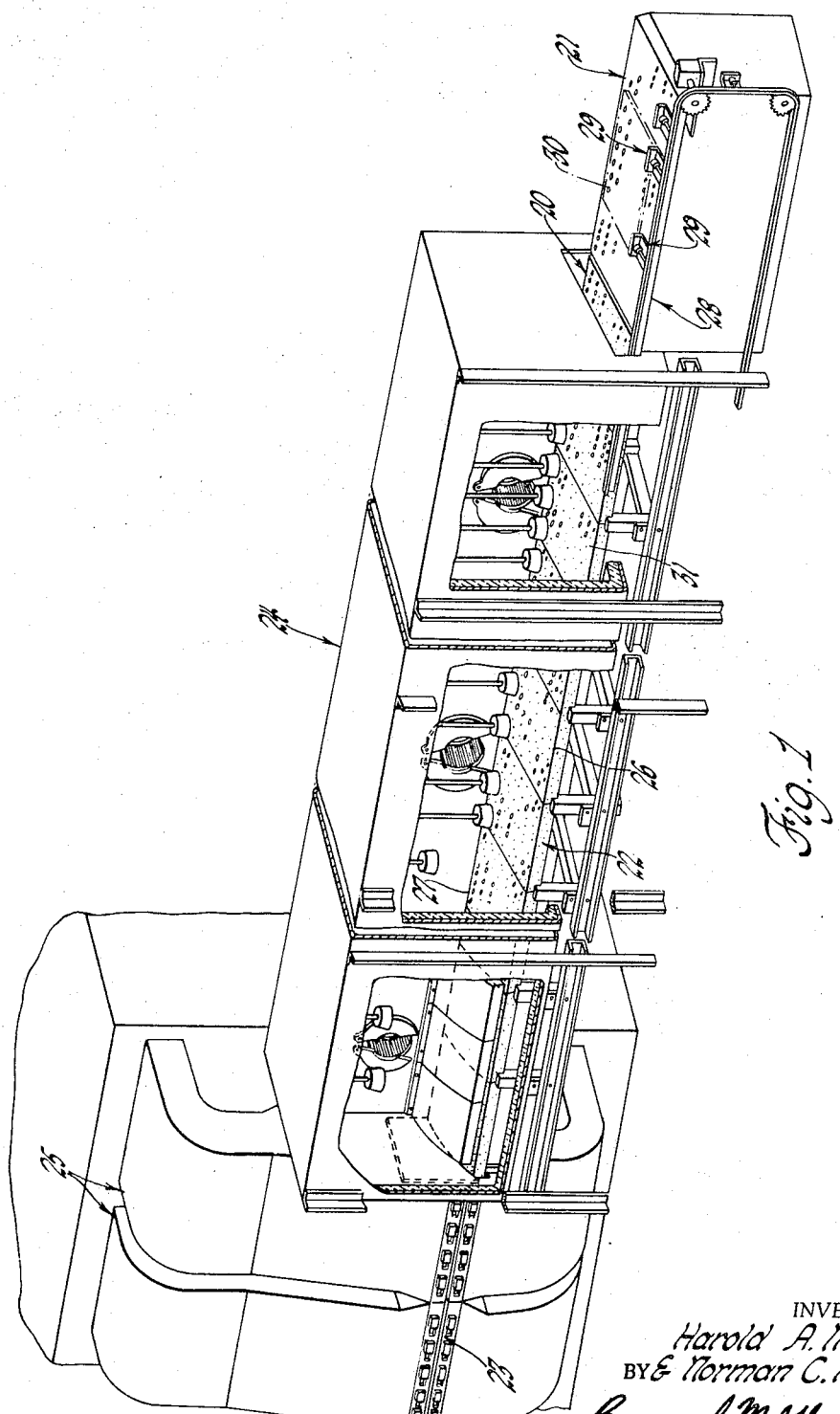
FIGURE 1 is an isometric view, with parts broken away and partially schematic, of the preferred apparatus and illustrates the bed configuration into and through the heating furnace wherein the glass sheets are curved, and into and through the blasthead wherein the curved glass sheets are tempered.
Figure 15:
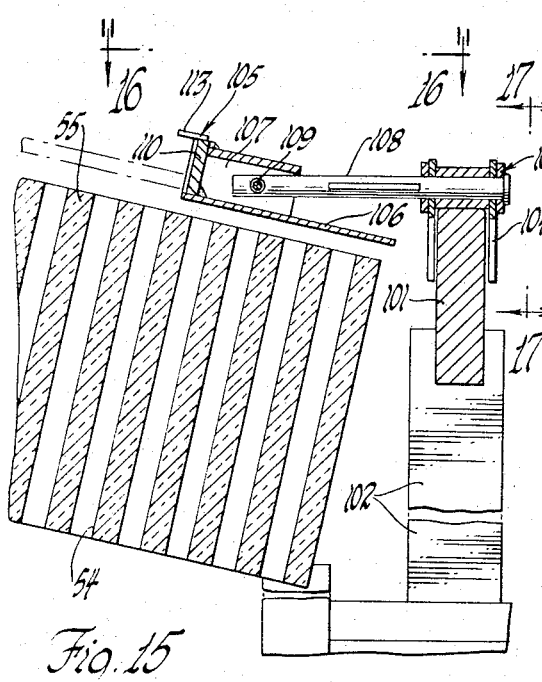
FIGURE 15 is a cross sectional view of a portion of the conveyor means extending along one side of the furnace of FIGURE 1 illustrating the position of the various parts.
Figure 16:
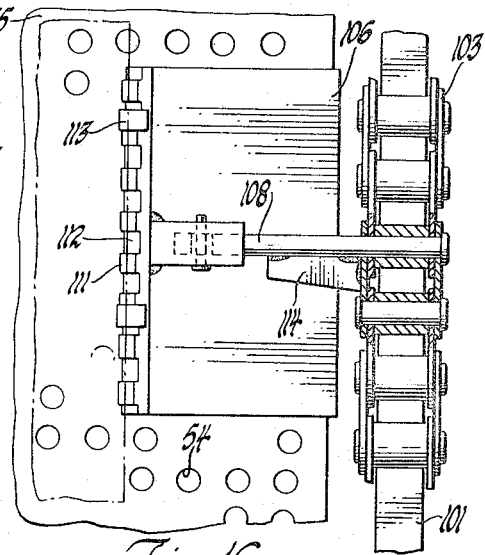
FIGURE 16 is a plan view of the conveyor system and conveyor support foot taken substantially along the line 16—16 of FIGURE 15 and looking in the direction of the arrows.
Figure 17:
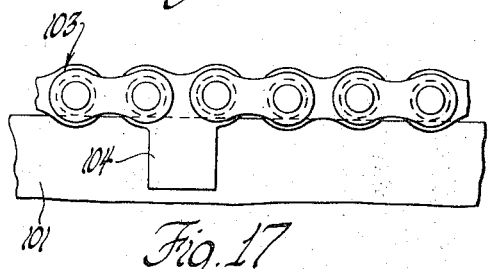
FIGURE 17 is a partial elevational view of a portion of the conveyor chain of FIGURES 15 and 16.

Referring more particularly to FIGURE 1, the apparatus shown comprises an elongate perforated bed, illustrated generally by the numeral 20 which, in the actual embodiment herein shown, is about 180 feet long and is composed of three main sections. These sections include a loading section 21, a heating and bending section 22, and a tempering section 23. The heating and bending section 22 is within and constitutes the floor of an elongate furnace structure, illustrated generally by the numeral 24, and the tempering section 23 extends through a cooling blasthead, illustrated generally by the numeral 25. The bed is flat throughout section 21 and most of section 22; and approximately two-thirds of the way through section 22 gradually becomes curved in a direction transverse to the longitudinal axis of the bed. Bed section 23 within the blasthead 25 and the portion of section 22 toward the end of the furnace adjacent the blasthead have a uniform transverse curvature substantially the same as that desired of the glass sheets to be manufactured. The plane of the bed is tilted about the longitudinal axis thereof at a slight angle to the horizontal, preferably from about 3° to 12°, and hence the left longitudinal edge of the bed, as shown at 26, is lower than the right edge 27. A chain conveyor system, illustrated generally by the numeral 28, carrying spaced pairs of glass sheet support pads 29, serves to move the glass sheets over the bed 20 from the loading section 21 through the furnace 24 and through the blasthead 25. Gas emitted from perforations in the bed 20 provides a film or cushion of gas on the bed for flotation of the glass sheets thereover in a manner to be described in detail hereinafter. In essence, then, and without attention at this time to important features and details, the apparatus operates as follows: The glass sheets 30 to be curved and tempered are placed onto the bed at loading section 21 with the bottom edge of each sheet resting on a pair of pads 29 secured to the conveyor chain 28. The glass sheets are conveyed by the chain and float over the bed out of contact therewith by reason of the gas emitted from the perforations in the bed. The floating glass sheets are thus guided through the furnace 24 where they are heated to deformation temperature by the hot gases emitted from the bed perforations and as they reach the curved portion of section 22, the sheets sag under gravity to conform to the curvature thereof, all the while supported on gas out of contact with the bed. Hence, when the sheets reach the end of the furnace, they are shaped with the full curvature desired. Transportation of the floating heated curved glass sheets then continues through the blasthead 25 where they are tempered by the cooling air projected from the bed perforations in the blasthead.

*Support bed structure*

As alluded to previously, one of the more serious difficulties with apparatus of the general type described is that of thermal expansion of the bed within the furnace. Since it is generally undesirable to raise the temperature of the glass sheets too rapidly lest there be non-uniform heating with resultant damage to the glass and since a high rate of production is desired, it will be manifest that there are advantages to using a furnace of considerable length; in the embodiment shown it is about 140 feet long. The furnace operates at a temperature upwards of 1100° F. and as high as 1350° F., and different temperature zones are maintained within the furnace, as will be hereinafter described. Initially and after any maintenance shutdown, the furnace must, of course, by taken from room temperature up to these operating temperatures and yet if there is uncompensated thermal expansion of the bed through its 140 foot length, bed distortion will result and this in turn leads to non-uniform glass flotation, poor heat distribution, marring of the glass due to contact with the bed, inaccurate glass curvature, and other problems. Of course, one way to minimize the problem of glass contact with the bed is to float the glass rather high off the bed by using considerable gas pressure; however, this is inherently expensive in that higher pressures involve higher costs, and it also has the serious disadvantage of affording less control over the precise shape imparted to the glass sheets. As will be described hereinafter, in the preferred system of the present invention the glass sheets float at an extremely low stable level over the bed, particularly just prior to and while the glass is curved, and this makes it all the more essential that there be no distortion in the bed as can result from thermal expansion.

In accordance with the invention, the entire bed section 22, is formed of material having an extremely low coefficient of thermal expansion not more than $1 \times 10^{-6}/°$ C., as well as excellent heat shock resistance, sufficient that the bed when at a temperature as high as about 1350° F. can be exposed to room temperature air without damage to the bed. More specifically, the bed section 22 in the furnace 24 is formed of fused quartz blocks 31, each of which has a width equal to the width of the bed and a length of about 30 inches. Hence, the entire 140-foot bed section 22 comprises fifty-six of the quartz blocks 31 axially aligned and in abutting relationship and preferably with a smooth powdered fused quartz caulking filling any crevices therebetween to seal and cement the blocks together. The blocks are manufactured by casting and then firing to sintering temperature granular fused quartz preferably of variated grain size. That is, quartz powder having a grain size of 325 mesh and finer is admixed with water to form a slurry and into this can be mixed granular quartz of varying size, from 200 mesh up to ⅛ inch, such mixture then being cast to the shape desired in a porous plaster mold or the like. After drying, the cast blocks are then fired to about 2000° F. to cause sintering, as is well known in the art. Preferably, the blocks are cast with the overall curved or other surface configuration desired and with at least the larger of the gas passages therein and, after firing, are machined to their precise final shape. Such blocks have so low a coefficient of thermal expansion, about $.54 \times 10^{-6}/°$ C. that the overall linear expansion of the full 140-foot bed in going from room temperature to 1200° F. is less than 1 inch and the expansion across the width of the bed and through the thickness of the bed is so little as to be negligible. Further, the fused quartz bed has extremely high heat resistance, erosion resistance, and heat shock resistance and therefore lasts indefinitely with practically no maintenance. Because of its superb thermal shock resistance, there is no danger of breakage in the bed even though when at a temperature of 1350° F. or so it is exposed to room temperature air, for example, in the case of an emergency furnace shut down. Because glass does not adhere strongly to the quartz, if softened glass should contact it and become hardened thereon, as in the case of a blower or power system failure or the like, it can be quite easily removed. As a still further advantage, the quartz bed is quite inexpensive to manufacture and install. While fused quartz ceramic as described is outstandingly superior it will be understood that other materials can be used for the bed. For example, nucleated glasses such as Pyroceram marketed by the Corning Glass Company, and various high alumina and/or high mullite ceramics known to have good thermal shock resistance and low coefficients of thermal expansion as well as good heat and erosion resistance can be used if desired, though not to the same advantage as fused quartz.

In the particular embodiment shown, the loading section 21 of bed 20 is formed of aluminum sheets 32; though if desired, it can be made of wood, plastic board or the like. The use of ceramic for the bed section 21 has no advantage and, in fact, is disadvantageous because of cost as compared with sheet aluminum or plastic and also because of the greater possibilities of injury to the glass during the loading operation. In the particular embodiment shown, the bed section 23 in the blast-head 25 is likewise made of aluminum sheet 33. However, for some embodiments it will be advantageous to use a bed material in the blasthead the same as that described for use in the furnace for two important reasons. First, because fused quartz, or other ceramic, has very low heat conductivity as compared with aluminum or other metal, there is little possibility of chill cracks developing in the glass sheets by reason of contact of the glass with the blasthead bed. With the threat of such glass damage eliminated, there is less need for absolute assurance against glass contact with the blasthead bed thus simplifying blasthead design. Secondly, the excellent heat shock resistance of the ceramic assures against bed damage in the case of hot and then cold gas impinging on the blasthead in rapid succession, as can occur in that portion of the blasthead adjacent the furnace. Further, the dimensional stability of the ceramic through a wide temperature range, from room temperature to well above 1350° F., assures maintenance of a perfect alignment between the bed surface in the furnace and that in the blasthead thereby better assuring against contact of the glass with the bed. Using a fused quartz bed in the furnace and the blasthead it is possible and in fact advantageous to have a single bed block span the line of separation between the furnace and the blasthead thereby absolutely assuring perfect bed alignment at this point. The high thermal shock resistance of the ceramic allows this without hazard of injury to the material by reason of the great temperature differential between the furnace and the blasthead.

As indicated above, the quartz bed section 22, albeit it has an extremely low coefficient of expansion, does expand very slightly on its longitudinal axis when heated to operating temperature. At the same time, however, the metal support structure of the furnace expands considerably when the furnace 24 is heated to operating temperature. Though it forms no part of the instant invention, it is appropriate to mention that in the embodiment shown compensation is made for this by supporting the bed on a support structure which is independent of the furnace whereby the furnace can expand without stressing the bed, the bed support being so constructed and positioned that its thermal expansion, in its temperature environment, is quite low and about that of the bed when the latter is heated to operating temperature. Such support structure is disclosed and covered in United States patent application Ser. No. 328,393 filed Dec. 5, 1963, now Patent No. 3,281,229 in the name of Harold McMaster and assigned to the assignee of the present invention.

In the embodiment of the invention shown in the accompanying drawings and described in detail herein, the glass sheets are treated to form curved glass sheets typical of what might be used in automobile side windows or the like. Under such conditions it is of course necessary that the bed 20 be curved at some point into the desired glass contour. For proper treatment of the glass sheets, the bed contour should not change too rapidly, nor change to the desired curvature before the glass sheet is raised to deformation temperature. Hence it is that the bed 20 has a flat upper surface over most of its length, in order to provide sufficient time for the glass sheets to reach deformation temperature, and in a zone toward the end of the furnace the bed surface contour changes gradually from the flat to curved. At the end of the furnace and into the blasthead, the contour of the bed 20 is such as to provide the curvature desired in the glass sheets. However, as alluded to previously, it is to be understood that the apparatus and method of this invention is not restricted to use for curving glass sheets, but may also be used for other glass treatments as well. For example, the furnace construction, but with the entire bed flat, may be used for tempering flat glass sheets, or it may be used for coating or annealing. In fact, the apparatus and method may be used for any treatment of sheet material wherein gas flotation is desirable and particularly when the sheets must additionally be heated.

Referring again to the structure of support bed 20, it will be noted from the various figures of the drawings that the bed sections are provided with a plurality of holes or perforations of varying patterns, size, and location. The purpose for this will become hereinafter more apparent, but for present purposes suffice it to say that the perforations permit the flow of gases through the bed to provide optimum support and heating of the glass sheets as they pass thereover. Along the major portion of the length of bed 20 there are only gas inlet passages extending through the various bed sections. In that portion of the bed where the glass has reached its deformation temperature and where the surface contour is curved, both inlet and exhaust passages are provided. The size, number and location of the passages permits the use of a low pressure flow system of recirculating gases to float the glass sheet over the bed and through the furnace.

Heating system

As has now become apparent, the method and apparatus described and shown herein makes use of an elongated furnace which in the embodiment shown is of generally box-like construction. The furnace walls and support structure can be of design well known in the art. It is of course desirable that the furnace be fully insulated and that the structural parts of the furnace be subjected to as little heat as possible to avoid expansion and contraction problems as the furnace is raised to the desired temperature. To this end, the furnace 24 may be constructed with top and bottom walls 34 and 35 and opposite side walls 36 and 37 having insulating material 38 disposed on the inner surfaces thereof. Structural support posts 39 and lateral supporting members 40 may be provided in any suitable manner and suitably anchored to support the remainder of the furnace, it being desirable to keep the posts 39 and stringers 40 outside of the insulating means 38 to eliminate expansion and contraction problems.

In order to provide heat within the furnace 24, a plurality of burners, illustrated generally by the numeral 41, are provided, in varying numbers and varying distances from the bed 20 disposed within the furnace, for purposes to become hereinafter more apparent. The burners 41 may be of any suitable type sufficient to provide the proper amount of heat and to operate on a convenient fuel, such as a gas and air mixture. The burners receive the fuel and air mixture through a conventional piping system, not shown. Radiant burners which burn at a temperature of about 2000° F. and which are well known in the glass processing furnace art are preferred.

Referring now to FIGURE 2, a schematic cross sectional view of the furnace is shown, and indicated thereon are various zones numbered 1 through 14. As has been previously alluded to, the embodiment of the furnace shown is 140 feet along; and thus each zone represents 10 feet of the furnace. In zones 1–7 inclusive, the burners 41 depend from the ceiling of the furnace toward the bed support 20. The number and location of the burners is such as to raise the temperature in the furnace 24 to a temperature of from 1200° F. to 1350° F., depending, of course, upon the type of operation to be carried out in the furnace. From what has thus far been stated it should be clear that for optimum operation of the apparatus it is important that the glass sheets float uniformely out of contact with the bed and, where the glass sheets are to be curved as in the embodiment shown, that nothing interfere with the sagging of the heat softened sheets by gravity so as to conform to the bed curvature. To the end of accomplishing such optimum performance it has been found highly desirable to provide means in the furnace for accelerating the heating of the top surfaces of the glass sheets, at least prior to that zone in the furnace where the curvature begins, zone 11 in the embodiment shown. Hence, as can be seen in FIGURES 1 and 5, the burners 41 in zones 1 to 10 are spaced more closely to the support bed than are the burners in the remainder of the furnace. Such burners, i.e. the burners in zones 1 to 10, by reason of their lowered position cause the hot combustion gases to actually play against the upper surfaces of the glass sheets thereby serving as the means to accelerate the heating of such surfaces. If desired, only those burners in zones about 8 to 10 (i.e., the zones immediately preceding that wherein the curvature begins) can be lowered, those in zones 1 to 6 being positioned higher; however, this will not serve to equal advantage for reasons which will be apparent from the following. If a glass sheet is heated more rapidly on one side than the other warpage inherently results. This is because glass is a poor heat conductor, considerable time being required for the heat imparted to one side to be transferred through the glass to the other side. Further, it will be clear from the foregoing description that in the apparatus shown, the flotation system for the glass sheets inherently and intentionally results in a relatively rapid heating of the bottom surfaces of the glass sheets, the flotation gases emitted from the bed being hot. In the absence of any means for heating the top surfaces of the glass sheets at a commensurate rate, warpage will therefore generally result and such warpage can and does occur about an axis transverse to the bed, the front and back edges of the sheet being high and the middle low. If such warpage is not corrected at least by the time the sheet reaches the zone where bed curvature commences, it can seriously interfere not only with the gravity sagging of the sheet into conformity with the bed but also with flotation. This is because the axis of warpage curvature is at right angles to the axis of bed curvature and hence even though the sheet is at deformation temperatures, it cannot freely sag to the curved contour of the bed. And not being able to conform to the bed, uneven spacing between the sheet and the curved bed results across the surface of the sheet thereby disrupting proper flotation and greatly increasing the possibility of glass contact with the bed. Hence, it is that it is highly desirable at least prior to the curvature zone to accelerate the heating of the upper surfaces of the glass sheets such that by the time the sheets reach the curvature zone, there is substantially no temperature gradient through their thickness and hence no warp to interfere with proper sagging and flotation. Of course, ideally warpage should be prevented or at least inhibited from the outset, throughout the furnace, and it is for this reason that lowered burners are used in zones 1 through 10 rather than in just those zones immediately preceding that wherein bed curvature begins. It will be of interest to note, however, that if for any reason it is not desirable or convenient, to use lowered burners or other means in zones 1 through 7 to accelerate heating of the upper surface of the glass sheets commensurate with the rate of heating of the bottom surfaces, the flotation system of the present invention is such that it permits this. That is, as will be brought out hereinafter, the float system is such that the sheets float relatively high in the early zones and hence, even though the sheets be warped in these zones there is little, if any, likelihood of contact between the glass and the bed due to warpage so long as the warpage is sufficiently corrected before the sheets reach the bed curvature zone.

In effect then, the burners are lowered to increase the rate of heating of the upper surfaces of the glass sheets by radiation and by impingement of the hot combustion product gases to thereby balance the heating rate to that of the bottom surfaces which is accelerated due to the impingement of the hot flotation gases. It will be understood that means other than lowered burners can be used if desired to accomplish such end. For example, burners or other heating means can be located remote from the glass and by means of a blower or the like the hot gases therefrom directed as by nozzles against the upper surfaces of the glass sheets, similar, for example, to the arrangement now to be described with reference to the last zone, zone 14, of the furnace.

In zone 14 it is desirable to "cool" the glass sheets before entry to the blasthead 25 by lowering the zone temperature to approximately 1150° F., or about 100° to 200° less than the temperature of the previous zone. The cooling process is gradual, and uniformity of cooling through the thickness of the glass is accomplished through the use of upper jets of 1100° to 1150° F. gas which play against the upper surface of the glass sheets to cool the upper surfaces at about the same rate as the lower surfaces are cooled by the 1100° to 1150° F. flotation gas emitted from the bed. For purposes herein it is sufficient to note that the "cooling" means 42 brings the temperature of the glass sheets from the deformation temperature of about 1250° to 1350° F. to a lesser temperature to initiate the tempering process which is completed in the blasthead 25.

It has been previously stated that the heating system for the glass sheets is a circulating hot gas system, and the circulation both supports the glass sheets and assists in heating the glass sheets as they pass along the support bed 20. To accomplished this, a longitudinal vertical wall 43 having spaced large circular openings adjacent the upper end thereof extends the length of the furnace, between the insulated side wall 36 and the support bed 20. Between the wall 43 and the insulated side wall 36 are a series of blowers, illustrated generally by the numeral 44, at spaced points along the length of the furnace, each blower being positioned at one of the large openings in the wall 43. Preferably there should be at least one such blower for each of the zones 1 through 14 for optimum circulation of the gases within the furnace 24. Wall 43, which constitutes a baffle is provided with a series of apertures or perforations 45 at the lower portion thereof, the perforations being below the level of the support bed 20. With the blowers 44 operating and the gases in the furnace 24 above the bed 20 being brought up to temperature by the burners 41, the gases will be circulated by the blowers 44 through the space between wall 43 and the insulated side wall 36 and blown through the perforations or apertures 45 in the baffle wall 43. The gases then flow into the plenum undernearth the bed and up through the perforations in the support bed 20 to float and heat the glass sheets in a manner to become hereinafter more apparent. Suitable baffle means 46 are located adjacent and below the front edge of support bed 20 to direct the flow of gases through the perforations in the support bed. A second baffle 47 between the vertical wall 43 and the bed 20 prevents the flow of gases past the bed. Vertical generally L shaped baffle plates 48 (see FIGURES 3 and 5) extending transverse of the furnace are spaced every ten feet to separate the heat zones. Such baffle plates have an upper leg which extends from the top to the bottom of the blower chamber, i.e., the space between wall 43 and the insulated side wall 36, and a bottom leg which extends laterally from the bottom perforated portion of wall 47 to the baffle 46, and vertically from the insulated bottom wall 35 to the underside of the bed which is supported by rows of spaced posts 52 and 53 (see FIGURE 4). Hence, the furnace shown has a total of fourteen blowers, one at the middle of each of the fourteen zones, the vertical baffles 48 separating the zones. The blowers are made of a high heat resistant metal sufficient to withstand upwards of 1500° F. and the electric motor drive means (not shown) for the blowers are located outside the furnace out of the high heat.

In operation, the blowers pull hot gases from the upper part of the furnace, and route these gases to the plenum underneath the bed from whence they are forced by the pressure from the blower up through perforations in the bed, thereby floating and heating the glass sheets. Then the gases circulate to the upper part of the furnace for recirculation as described.

It will be apparent from the foregoing that the glass sheets passing along the support bed 20 will be heated by heat from the burners 41 as well as by the gases circulated by the blowers 44 through the support bed 20. Since these gases also supply the flotation and support for the glass sheets, it is important that regulation means be provided for the blowers 44 to regulate the flow rate and thus the proper flotation of the glass sheets over the bed 20. For these purposes, suitable shutters or doors 49 and 50 are provided for each blower. The shutters 49 and 50 are pivotally secured as at 51 to the wall 43 or any other suitable structure and are of semi-circular shape, as best illustrated in FIGURE 3. The shutters are operable to partially close off the opening in the wall 43 leading to the blower 44 to regulate the flow rate therethrough. Suitable control means, not shown, are provided to control the position of the shutters and hence the size of the opening leading from the upper part of the furnace, wherein the heating means is located, to the blowers.

For otherwise regulating the heat and circulation in the furnace 24, convenient and suitable instrumentation may be provided and suitable controls or regulators conveniently mounted and operable to control the heat generated by the burners 41 and the circulation of gases through the blowers 44.

*Flotation system*

It has now been explained that the glass sheets 30 are floated along the length of the support bed 20 by means of gases circulated and recirculated from the interior of the furnace through perforations in the support bed formed of ceramic section 31.

In the portion of the support bed 20 at the first part of the furnace 24, that is, from zone 1 to the middle of zone 10, the bed sections 31 may be generally rectangular flat sections approximately 30 inches long and of the desired width. Each of the sections in zones 1 through 9 is provided with a plurality of perforations to permit gas flow upwardly therethrough. FIGURE 6 is a perspective view of a typical bed section 31a in this portion of the furnace and illustrates the perforations 54 formed therethrough. It has been found that for optimum flotation of the glass sheets over this section of the bed, the perforations preferably be about ⅛-inch diameters and spaced one-half inch apart laterally of the bed and three-quarters of an inch apart longitudinally of the bed. The perforations in adjacent transverse rows are staggered longitudinally such that every fifth row repeats the pattern and the ⅛-inch stripe of impact of gas from each perforation on the glass sheets moving thereover slightly overlaps the strips from longitudinally slightly offset neighboring perforations to afford uniform support and heating.

The hot combustion product gases circulated by the blowers 44 pass up through the perforations 54 to the top surface 55 of each section. With the glass sheet 30 disposed above the upper surface 55 and with the gases flowing through the perforations 54, a blanket of such gases will form over the surface 55 and on which the glass sheets 30 will float and become heated. The gases are permitted to flow across the surface 55, that is, between the surface 55 and the glass sheet 30, and out from underneath the glass sheets 30 at the edges thereof. The hot gases continue to circulate by means of the blowers 44 through the portion of the furnace containing the burners 41 and again to the underside of the bed section 31a. The flow rate of the gases caused by the blower 44 and the size of the apertures 54 are such as to provide a suitable volume of gas between the glass sheet 30 and the upper surface 55 to float the glass sheet thereover. Such volume of gas is at a relatively low pressure; it has been found that pressures in the neighborhood of one inch to two inches of water column pressure in the plenum in this portion of the furnace is sufficient. The average pressure between the glass and the bed is equal to the weight of the glass per unit of surface which in the case of ¼-inch thick glass is ⅝-inch water column pressure. It has been found that a flow rate of approximately 7000 cubic feet per minute per 25 square feet of bed is ample. With the proper amount of gas flow to generate the proper pressure, the glass sheets 30 will float across the surface of the bed portion 31a at a distance of somewhere between .04 inch and .25 inch in this section of the furnace. This relatively high float in this portion of the furnace where the glass is rigid is advantageous in that it reduces the possibility of glass contact with the bed. Also, as indicated previously, when the cold glass sheets first enter into the furnace there is likely to be a certain amount of warpage thereby increasing the possibilities of glass contact with the bed which possibilities are, as stated above, reduced by using a higher float. Hence, extremely accurate control of the bed surface is not essential in this portion of the furnace. At the edges of the glass sheets the pressure is substantially zero and it will be obvious, therefore, that once the glass sheets reach deformation temperature this system of support would not be feasible and hence another configuration is used, such configuration to be described forthwith.

The hot gases emitted through the perforations 54 heat the glass sheets up to deformation temperature by the time the sheets reach zone 10. In the section of the furnace including zones 10, 11, 12, 13 and 14, that is, the last part of the flat portion and all those portions where the contour of the support bed 20 is curved, the ceramic block sections 31b take on a perforation pattern and configuration such as is best illustrated in FIGURES 7 through 9. In this portion of the furnace the sections 31b are provided with both inlet and exhaust perforations or apertures in a desired pattern. The inlet perforations 56 differ in these zones of the bed 20 in that the upper portions adjacent the top surface 57 of the block 31b are enlarged, as at 58, in a manner similar to countersinking. The inlet perforations 56 are arranged in spaced transverse rows, as rows 59 and 60 in FIGURE 8, and disposed between the rows are alternate rows of exhaust perforations 61. Exhaust perforations 61, as best illustrated in FIGURE 9, extend partially through the block section 31b and communicate with transverse passages 62 extending through the block section 31b from side to side; thus, perforations or passages 61 and transverse passages 62 comprise channels communicating with the surface 57. Such passages 62 open through the side of the block sections 31b above the baffles 47 in the furnace 24 and thus permit the exhaust gases to be exhausted directly into the furnace 24 for recirculation. The apparatus, therefore, utilizes one or more integral ceramic blocks 31 as illustrated in FIGURE 7 including a first upper surface 57 over which fluid may flow to maintain a sheet of glass in spaced relationship thereto. There is also included a second surface which defines the bottom of each block. The first and second surfaces are interconnected by a plurality of sides and a plurality of discrete channels are spaced throughout and communicate with the upper surface 57 and extend between and through at least one of the sides. The channels comprise a second plurality of passages 62 extending completely through the block between and through the sides thereof and a third plurality of passages 61 which extend into the block from the upper surface 57 to communicate with the passages 62. The first plurality of discrete passages 56 are spaced throughout the upper surface 57 among the passages 61 and extend through the interior of the block from the upper surface 57 to the second spaced surface. The aggregate of the perimeters of the inlet perforations in the plane of the bed surface is greater than the aggregate of the perimeters of the outlet perforations in the same plane such that when a sheet of glass is positioned in close spaced parallel relationship to the bed surface, the aggregate of the areas of imaginary walls extending from the outlet orifices to the plane of the glass is less than the aggregate areas of imaginary walls extending from the inlet perforations to the plane of the glass. The outlets function, therefore, to provide restrictive orifices for the gas flow and create a positive pressure sufficient to support the glass. Hence, where the exhaust and inlet perforations are all round and where the number of exhaust openings is about equal to the inlet openings, as in the embodiment shown, the diameter of the exhaust perforations is smaller than that of the inlet perforations.

It is important to note in FIGURE 8, therefore, that the diameter and therefore the perimeter of the exhaust perforations 61 is smaller than that of the enlarged upper end of the inlet perforations 58. With a glass sheet 30 spaced from the surface 57 of the section 31b, there is formed annular orifice 63 about the inlet perforations 58 which is larger than a similar annular orifice 64 formed between the glass sheet and the outlet or exhaust perforations 61. Since the inlet orifice 62 is larger than the exhaust orifice 63 by reason of the larger perimeter of the inlet orifice, there will be a positive pressure above the surface 57 sufficient to maintain the glass sheet on the blanket of gas thus produced. In effect, then, there is substantially continuous gas blanket support for the glass sheets, the only voids in the gas blanket support being directly over the exhaust perforations. Summarizing, the system is functionally one wherein the gas support blanket is provided by restrictive exhaust perforations which create a back pressure which increases rapidly as the glass sheet settles toward or approaches the bed and the area of the annular orifices 64 decreases until the glass sheet reaches an equilibrium level above the bed. The inlet perforations serve merely to supply low pressure gas to the constantly recirculating gas blanket. As the distance between the glass sheet and the bed increases, the back pressure around the outlet perforations decreases not only because of the resulting increase in the size of the orifices at the outlets, as described, but also because the aggregate of the inlet passages at their smallest diameter (i.e., below the flared upper ends) are smaller than the aggregate of the outlet passages thereby restricting the supply of low pressure gas from the plenum to the surface of the bed.

Measurements show that the pressure in the enlarged generally conically shaped upper extremities of the inlet passages is not substantially less than the pressure in the plenum chamber. The plenum chamber pressure in this zone of the furnace wherein both inlets and exhaust are used may be on the order of 1.8 to 2.5 inches water column pressure. The pressure of the gas support blanket between the bed and the glass sheet is about equal to the plenum pressure immediately over the inlet perforations and tapers off toward the exhaust orifices, the pressure directly over the exhaust orifices being zero; however, there is a positive presure over substantially the entire surface of the bed, except directly over the exhaust perforations, sufficient to support the glass sheet at its equilibrium level as before described. Since the gases can circulate from the inlet perforations to nearby outlet perforations there is a relatively uniform average pressure through the central areas of the glass up to a narrow, about one-half inch, margin area adjacent to the edges of the glass from which area the gases can escape about the edges of the glass. To compensate for this, the exhaust perforations 61 decrease in size from the center of the section 31 to the edges thereof, as can be seen in FIGURE 8. This particular feature of the exhaust perforation pattern is more clearly described and is claimed in United States patent application Ser. No. 328,409, filed Dec. 5, 1963, in the names of Harold A. McMaster and Arthur F. Van Zee and assigned to the assignee of the present invention.

Because the gas feed from the inlets need only be and is at low pressure, there is little or no tendency of the hot gases being fed to cause localized distortions in the glass as is the case where high pressure jets impinge against the bottom glass surface.

Since heated gases are entering through the perforations 56, it would not be desirable to have a continual axial row of inlet perforations since this would produce an axial or longitudinal stripe of hot gases against the under surface of the glass sheet 30. To avoid this problem, each inlet passage 56 in the longitudinal direction is offset slightly from the preceding inlet passage 56. A suitable spacing has been discovered to be a repeat of every fifth row of inlet passages and to equally displace the succeeding perforations therebetween. In this manner, the entire surface of the glass sheet 30 will be properly heated without localizing or aligning heated sections thereof. The outlet perforations are likewise staggered, in the direction generally longitudinally of the bed, each fifth row repeating.

The flow rate and the spacing and pattern of the perforations in the block 31b in the zones 10 through 14 of the furnace are such as to make the glass sheet 30 float at a closer distance to the support bed 20 than during the earlier section. The inlet perforations in block sections 31b have a diameter of one-eighth inch flaring outwardly to about three-eighth inch at the top surface of the bed section. The depth of the flare is not critical but may be approximately one-quarter of an inch. The inlet passages below the flared upper ends are small in comparison to the outlet passages for the reason alluded to previously. The largest of the exhaust perforations are slightly less than one-quarter inch in diameter. Both the inlet and exhaust perforations may be one and one-half inches apart longitudinally and one-half inch apart laterally. Further, as previously mentioned, the outlet perforations may decrease in size from the center of the block section laterally to the edges, the perforations at the edge being one-eighth inch in diameter and those between the center and the edge being three-sixteenths inch in diameter.

It has been found desirable to provide a flow rate of approximately 3500 cubic feet per minute per 25 square feet of bed area and a gas presure of somewhat in the neighborhood of 1.8 to 2.5 inches of water pressure in the plenum section. Under such conditions, the glass sheets 30 will float lower or closer to the support bed than in the earlier sections, and at a distance of about .005 to .020 inch. Under such conditions the glass sheets more readily conform to the contour of the surface 57 of the bed sections 31b.

In between the high float section and the low float section of the bed as aforedescribed, is a float transition zone that extends from the beginning to the middle of zone 10 of the furnace. Such transition zone brings the glass sheets 30 from the high float condition to the low float condition in a smooth and gradual manner. The transition zone accomplishes this by means of a gradual increase in the number of exhaust perforations per unit of bed length, from none at the beginning of zone 10 to a full complement of exhauts at the middle of zone 10. This is more clearly described and shown in United States patent application Ser. No. 328,409, filed Dec. 5, 1963, in the names of Harold A. McMaster and Arthur F. Van Zee and assigned to the assignee of the present application.

There is a second bed transition zone, that being the transition from flat to curved shape. It is important that this curvature transition occur in such a manner that no portion of the glass sheet 30 engages or drags on the surface of the support bed 20. Keeping in mind that the glass sheet 30 is semi-rigid and is floating quite close to the bed, and that it is the force of gravity which causes the glass sheet to deform into the curved condition following the contour of the support bed 20, it will be seen that if the beginning of the transition is too abrupt, it is possible for the center of the edge of the glass sheet, adjacent the chain conveyor, to hit or scrape the edge of support bed 20. Also, if in the remainder of the transition the rate of curvature change is too rapid, there can be nonuniformity in the spacing of the sheet from the bed due to the inability of the sheet to bend rapidly enough to conform to the changing curvature, and this can result in nonuniformity of the gas support blanket over the bottom surface of the glass. If this occurs the glass sheet can drop to the point where the middle of the sheet adjacent the bed centerline contacts and drags on the bed. To attain the curvature transition in the shortest possible distance and with the least possibility of scraping or pressure nonuniformity problems as aforesaid, it is highly advantageous to shape the bed curvature transition zone such that the bed edges first fall away at a low rate, then at an increased rate, and then finally at a low rate. In other words, the rate of change in chord height should be such as to provide a curve similar to a sine curve when plotted. This is disclosed in detail and covered in United States patent application Ser. No. 395,717, filed Sept. 11, 1964, now Patent No. 3,291,590, in the name of Harold A. McMaster and assigned to the assignee of the present invention.

From the foregoing it is apparent that the flotation of the glass sheets 30 over the support bed 20 is accomplished by means of a flow system resulting from the circulation of hot combustion gases from the furnace through a suitable blower assembly and through the support bed 20. Although the foregoing has been described with reference to a block section having a plurality of inlet perforations formed therethrough, this function may be accomplished in some other suitable manner. For example, it is possible to provide a porous ceramic block section which will permit free flow of gases therethrough. Such would be sufficient to support the glass sheets on the desired blanket of gases provided, of course, that the flow rate is proper. In order to provide exhaust outlets, the same type of porous block section may be used and a series of nonporous pipes or tubes may be inserted or formed in the block section to communicate with the upper surface of the bed and lead to the desired exhaust passages or to otherwise exhaust the gases from the surface of the block section. Hence, the exhaust outlets by reason of their number and restricted size provide the required back pressure to form the gas support blanket, the gases being fed through the pores of the blocks serving to feed relatively low pressure gas at a support rate to maintain the blanket. Tubular inserts may be easily placed in the block sections as they are originally molded, the inserts being of suitable size and shape to properly convey the exhaust gases from between the glass sheet 30 and the bed section. The tubular inserts, which constitute the exhaust perforations, can, if desired, extend slightly above the plane of the remainder of the bed, the upper extremities of the exhaust tubes being in a common plane or other surface which, in effect, constitutes the plane or surface desired of the bed to provide the shape desired to the glass sheets. Other configurations will be apparent to those having skill in the art after having had reference to the specification and drawings of the present invention.

*Tempering blasthead*

In a glass treating method and apparatus shown, the curved glass sheets are tempered immediately upon leaving the furnace, the tempering blasthead being shown at 25 in FIGURE 1. Tempering of the glass has numerous well-known advantages and is accomplished by rapidly and uniformly cooling the glass sheets after they have been heated to a particular temperature. Tempered glass is most desirable in automobile installations because of the safety features involved. It is exceptionally strong; and if it does break, it disintegrates to smooth rather than sharp-edge particles.

Referring in particular to FIGURES 10 through 14, the blasthead includes upper and lower beds, illustrated generally by the numerals 69 and 70, respectively. Beds 69 and 70 are provided with perforations or air passages, convex and the upper bed 69 being concave, to receive the curved glass sheets 30 therebetween. Each of the beds 69 and 70 are provided with perforations of air passages, and each is provided with ductwork 71 and 72 which leads from a suitable air blower apparatus, illustrated generally in FIGURE 1 by the numeral 73. Such apparatus may be any known type of construction suitable to provide a blast of room temperature air to the upper and lower beds 69 and 70 in accordance with normal tempering techniques.

As has been previously noted, it is intended that the glass sheets 30 be floated on the lower bed 70 as they pass through the blasthead 25. To accomplish this, the lower blasthead bed 70 is constructed as shown in FIGURE 11 and includes a lower plate member 74 separated from the upper bed surface 76 by suitable perforated side walls 78 and 79. Disposed between the lower plate 74 and the upper plate 76 are a plurality of tubular members 80 which serve to convey the room temperature air therethrough and to the lower surface of the glass sheets 30.

A low float zone and then a high float zone are used in the particular blasthead shown. In the low float zone, the tubular members 80 are disposed in rows transversely of the bed 70, as illustrated in FIGURE 12, wherein rows 81 and 82 of inlet tubes 80 are in shallow transverse grooves 86 and are disposed in adjacent relation and separated by rows of exhaust passages 83 and 84. The exhaust passages 85 in these rows are formed through the ridges intermediate the grooves in the upper plate member 76 and communicate with the hollow interior between the upper plate 76 and the lower plate 74. In the high float zone, there are no transverse grooves as in the low float zone.

In one method of operation it is desirable to transport the glass rapidly from the furnace to the blasthead and then suddenly apply quenching air to the entire area of the glass at once. To prevent warping or twisting of the soft glass it can be conveyed on a thin bed of air over the lower blasthead which is carefully aligned as a continuation of the hot furnace bed. When the glass is fully inside the blasthead, the conveyor is slowed and the pressure is raised from about 1½ inches to 5 inches water column or more, for rapid quenching of both top and bottom surfaces of the glass and it is desirable that the glass now float half-way between the upper and lower blastheads for uniform treatment. Thus it is necessary that the glass rise about ½ inch or more when full air pressure is applied.

The grooves 86 FIGURE 13 prevent the glass from closing off the ends of the tubes 80 when the glass is floating low during the rapid transport from the furnace and the glass will float .010 inch to .060 inch above the ridges of exhaust holes 85 until the back pressure just supports the glass as described for the furnace bed. When the full quenching air pressure is applied, the back pressure in the exhaust holes exceeds the weight of the glass per unit of surface and the glass rises until the air escaping around its edges balances the pressure equal to the weight of the glass per unit of surface. Since the glass surfaces harden very rapidly, very little warpage can occur. Additional portions of the lower blasthead over which the glass always floats at a high level as it continues to move away from the furnace do not need the grooves 86. The low float, rapid transport sequence is not needed for smaller glass sizes which can be transported directly into high air quenching pressures by slightly lowering the blasthead bed relative to the furnace bed. This is particularly true where the glass is precooled to about 1150° F. in the last furnace zone to make it more rigid as it leaves the furnace.

The upper bed 69 is generally similar to the lower bed having an upper plate 87 separated from a lower plate 88 by a plurality of air inlet tubes 89 opening directly into the surface of the lower plate 88. The upper bed has large exhaust holes 92 to keep the back pressure low so as not to force the glass downward. Plates 87 and 88 are joined by perforated side walls 90 and 91, to form a generally box-like structure, the space therein receiving the exhaust air from exhaust ports 92 and routing it out through the openings in the side walls. Ductwork 71 conveys the cooling air from its source to the tubes 89 and thus to the upper surface of the glass sheet 30 disposed in the blasthead 25. The flow through the tubular members 89 is such as to balance the flow through the lower tubular members 80 to prevent the glass sheet from engaging one or the other of the blasthead inner plates. With the proper control of the flow rates this is not too serious a problem, and the glass sheet 30 may be easily balanced between the two plate members 88 and 76, respectively.

One means of controlling the flo wrate is to control the exhaust from between the plate members. To accomplish this, suitable shutter arrangements, such as best illustrated in FIGURE 14, may be provided. Formed in the side wall 79 of the lower bed 70 and in the side wall 91 of the upper bed 69 may be a series of rectangular ports 93 and 94, respectively. Disposed over ports 93 and 94 are slidable shutter members 95 and 96 respectively sliding in the brackets 97 and 98 in the lower member 70, brackets 99 and 100 in the upper member 69. The shutters 95 and 96 may be slid in one direction or the other to open or close the ports 93 and 94 leading to the interior of the beds 69 and 70. By thus controlling the exhaust flow, it is possible to properly control the position of the blass sheet 30 relative to the beds 69 and 70.

In the particular embodiment shown the first portion of the blasthead lower bed 70 has inlet perforations of about one-quarter inch in diameter, and spaced one inch apart laterally and one inch apart longitudinally. The rows of inlet tubes are staggered in the longitudinal direction such that every sixth row repeats. The outlet perforations in bottom bed 70 are slightly smaller in diameter that the inlets and are spaced apart one-half inch laterally and one inch longitudinally. The first portion of lower bed 70 is provided with grooves 86 as aforesaid.

In the low float portion of the blasthead 25, the inlet perforations in the upper bed have a diameter of about one-quarter inch and are spaced apart one inch in lateral and longitudinal directions. The outlet perforations in this section of the upper bed are of five-eighths inch diameter and are spaced apart on one-inch centers.

The perforation dimensions in the high float portion of blasthead 25 may be the same as those for the first section.

Thus, the glass sheets may be transported through the furnace 24 for heating to deformation temperature prior to the tempering operation and upon leaving the furnace 24 pass directly into the blasthead 25. The glass sheets 30 continue to float over the support bed and are cooled from the temperature at which they leave the furnace 24 to the proper temperature for removal from the blasthead 25 by the machine operator.

*Conveyor system*

As has been previously pointed out, the support bed 20, extending through the furnace 24 and through the blasthead 25, is disposed therewith at a slight angle, 12° in the embodiment shown, relative to the horizontal plane of the furnace. With the glass sheet 30 floating on a blanket of gases above the support bed 20 and the blanket of gases being of substantially constant thickness, it is obvious that the glass sheet will have a component of weight force directed along the plane of the surface of the support bed 20. Due to this angularity and this component of force, it is possible to provide a conveyor system which will transport the glass sheets along the length of the support bed with very light contact with the glass sheet 30. It will be further apparent that with the glass sheet 30 floating on the blanket of hot gases over the support bed 20, that very little force will be necessary to transport or convey the glass sheet along the bed, and thus very light contact in the direction of travel is all that is necessary.

Referring now to FIGURE 1 and FIGURES 15 through 21, the conveyor system for the glass sheets includes a guide rail 101 which is formed in aligned sections and extends alongside the lower edge of the bed for the entire length of the loading station, the furnace, and blasthead. The rail 101 may be suitably supported by posts 102, supported on the furnace superstructure in a suitable manner. Riding on guide rail 101 is a conveyor chain, indicated generally by the numeral 103, of typical link and bearing rod construction having spaced members 104 depending downwardly therefrom at spaced points therealong and straddling the rail 101. An electric motor driven sprocket serves as means for driving the chain. The particular features of the chain and its drive means whereby the chain is maintained taut and is driven at a smooth uniform speed through the furnace and blasthead are described in detail and claimed in United States Patent application Ser. No. 478,521 filed July 15, 1965, now Patent No. 3,282,447 in the name of Harold A. McMaster and assigned to the assignee of the present invention.

Extending inwardly from the chain 103 toward the support bed 20, and at properly spaced intervals therealong, are support feet, indicated generally by the numeral 105. Each support foot 105 includes a lower plate member 106 which is supported on the support bed 20 by flotation in the same manner as the glass sheets 30. The plate members are provided with upstanding ribs 107 to which are secured suitable rods 108 extending and secured to the conveyor chain 103. The connection 109 between the rods 108 and the ribs 107 is rather loose to allow some pivotal movement for purposes to be hereinafter described.

Extending upwardly from the inner edge of lower plate 106 is substantially vertical plate member 110 provided with a series of vertical lands and grooves 111 and 112, respectively. It is desirable that the face of plate member 110 be as perpendicular as possible to the plane of the glass sheet 30 disposed thereagainst, and the glass sheet 30 with its component of weight force in the direction of its surface, lightly engages the lands 111 on the upstanding plates 110. The slight frictional engagement of the plate members 110 with the glass sheets 30 is sufficient to convey the glass sheets through the furnace 24 and blasthead 25 along with the chain 103. Extending outwardly from the top edge of the plate members 110 may be spaced tabs 113 which serve as a stop means to prevent extreme upward movement of the glass sheets 30. Normally, however, the glass sheets do not engage the tabs 113 but are engaged with the upstanding plates 110 toward the lower edge thereof.

Extending outwardly from the rod members 108 are plates 114 which are secured to the rod members 108 and to the chain 103 to properly direct the rod members 108 toward the interior of the furnace 24. Such plates 114 maintain the precise angularity of the rod members relative to the chain 102 that is desirable in the installation. The plate members 114 also serve to structurally maintain the rod members on the chain 103.

Figure 18:
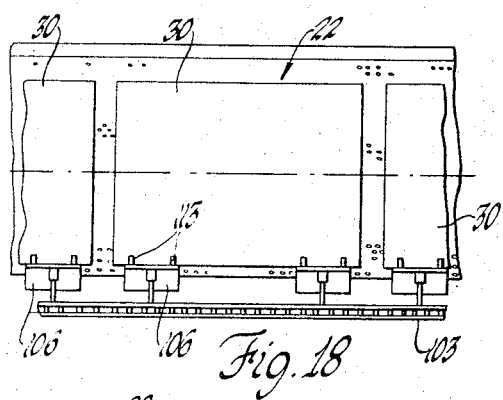
FIGURE 18 is a schematic view of a portion of the bed assembly and conveyor means showing the position of the glass sheets for transportation across the bed.

As indicated in FIGURE 18, the support feet 105 engage the glass sheets 30, one at the forward end of the sheet and the other at the rearward end of the sheet. If more support is necessary for the glass sheets 30, or if the glass sheets 30 are of extreme length, it may be desirable to provide additional support feet 104, located as necessary for support of the glass.

Figure 19:
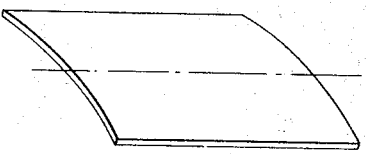
FIGURE 19 is a perspective view of a glass sheet such as might be treated in the furnace illustrated in FIGURE 1 and wherein the axis of the curvature is parallel to the edge of the sheet.
Figure 20:
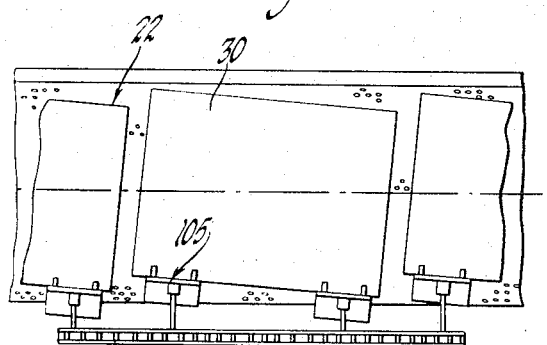
FIGURE 20 is a schematic view of a portion of the bed assembly showing glass sheets in another portion for transportation across the bed and through the furnace of FIGURE 1.
Figure 21:
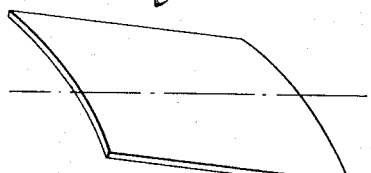
FIGURE 21 is a perspective view of a glass sheet such as might be treated in the furnace of FIGURE 1 and with the axis of curvature angularly disposed relative to the edge of the glass sheet.

As illustrated in FIGURES 18 and 19, the glass sheets supported by the feet 105 come out of the furnace 24 and blasthead 25 with a curvature about the longitudinal axis of the glass sheets 30. This is accomplished by spacing the front support foot the same distance from the chain 103 as the rear support foot, thus having the edge of the glass sheet 30 parallel to its longitudinal center line. However, if it is desired to form glass sheets with a cylindrical curvature about an axis at an angle to the edge of the glass, this can be conveniently accomplished with the apparatus of this invention, as is illustrated in FIGURES 20 and 21. As shown in these figures, the glass sheet has a curvature about a center line angularly disposed relative to the central axis of the glass sheet. This is accomplished by having the distance of the front support foot 105 from the chain 103 greater than is the distance of the rear support foot, as illustrated in FIGURE 20. Under such conditions, the glass sheeet 30 will be forced to float along the support bed 20 obliquely of the longitudinal axis of the support bed, and thus the desired curvature and axis of curvature are obtained. Where considerable angularity between the axis of curvature and the longitudinal axis of the sheet is desired, it may be advantageous to provide an extension on the rear foot to engage the rear edge of the glass and thereby insure against the glass sheet slipping from the support feet within the furnace. It will be apparent that any axis of curvature may be provided by the combination of support foot location and the surface contour of the support bed 20.

As indicated above in conjunction with the tempering operation, the conveyor can be of constant speed or it can be of variable speed so that the glass sheets can be moved relatively rapidly into the blasthead and then slowed down within the blasthead. Of course, where a single variable speed chain is used this will mean that the sheets within the furnace also move at varying speeds. In one method of operation, the glass sheets are sent through the apparatus in spaced pairs, the conveyor speed changes being sequenced such that as a pair of sheets is being moved into the blasthead at slightly increased speed, spaced pairs of sheets within the furnace are fore and aft of but not directly over the curvature transition zone. Of course, other arrangements can be used if desired. For example, a separate higher speed conveyor chain can be used for the blasthead, such chain being cooperative with that through the furnace so that the glass sheets are transferred from the one to the other at the end of the furnace. Where this system is used it is desirable that means be provided to preheat the support feet on the blasthead chain before they come in contact with the hot glass lest chill cracks develop in the sheets when contacted by such support feet.

To inhibit the flow of cool air into the furnace from the blasthead and hot gas into the blasthead from the furnace, a reciprocable door can be provided between the furnace and blasthead as indicated in broken outline at 119 in FIGURE 1. Such door can be raised to allow passage of one or more glass sheets into the blasthead, and then lowered again by suitable means cooperative with the chain or the chain drive means.

*Loading station*

In order to load the glass sheets 30 into the furnace 24, a suitable loading station (see FIGURE 1) is provided, such loading station including a bed section made of aluminum or the like and having a plurality of perforations 116 formed therethrough. A suitable air supply system (not shown) within the housing 117 supporting the loading bed section 21 provides a flow of air through the perforations 116 to float the glass sheets 30 thereover. In practice, the operator may take a glass sheet and place it over the bed and against a properly spaced pair of support feet 105 on the conveyor chain 103 which extends along the edge of the bed section 21. The glass sheet 30, as it approaches the surface of the bed, receives the supporting air from the perforations 116, and a blanket of air disposed between the glass sheet 30 and the support 115 supports the glass sheet and carries it into the furnace 24 as the conveyor chain moves therealong. In this portion of the bed support, only gas inlet perforations need be provided, the gas exhausting from the edges of the sheet of glass and outwardly into the atmosphere. Alternatively, suitable recirculating means may be provided at the loading station if such is desirable; and any suitable recirculation system may be provided consistent with the flow requirements and other parameters necessary to support the glass sheet.

Thus, a method and apparatus for treating glass sheets is provided which is extremely efficient and economical in its operation and construction. The glass sheets are conveyed along a suitable support bed having perforations formed therein, and a recirculating gas system provides both support for the glass sheets and heat for the glass sheets as they are conveyed through the furnace and the blasthead for the necessary treating operations. The recirculating system includes a series of blower devices which convey hot gases from the furnace to a point below the support bed and thence through the perforations therein to the under surface of the glass sheet. Suitable regulation means are provided for the amount of flow through the blower systems which are simple and efficient to operate and maintain.

The support bed itself is of such construction as to minimize to the greatest extent possible the degree of expansion and contraction which might come about due to the heating up and cooling down of the furnace. The manufacture of the support bed of non-metallic material having an extremely low coefficient of thermal expansion and high thermal shock resistance, contributes to the precision and quality of the glass sheets treated by the method and apparatus. The position, location, and pattern of the perforations in the support bed, in conjunction with the circulating gas system, produces optimum flotation characteristics for supporting the glass sheets as they pass through the furnace. These combine to create a treated glass sheet of optimum properties and precision without surface mars, scratches, or any other deformities. Tempered glass manufactured with the apparatus is particularly characterized by the marked reduction in striations as compared with glass sheets tempered with other types of apparatus. The contour of the support bed may be changed or altered depending on the type of operation and the shape of the glass sheets which are to be produced, and the various operations carried out within the furnace may be tailored to meet the desired operation.

The conveyor system which moves the glass sheets through the furnace and through the blasthead is extremely simple in construction and operation and affords minimal contact with the glass sheets to avoid problems of seriously marring the glass surface. The method completely eliminates the need for a high pressure float system which requires complicated and cumbersome equipment and generally results in surface distortions due to the impingement of the high pressure hot gases onto the glass surface.

Numerous modifications and alterations to the structure and to the various parts of the furnace, blasthead, supporting bed, conveyor means and the like, will become readily apparent to those having ordinary skill in the art after having had reference to the foregoing description and drawings. For example, whereas it is preferred to use a convexly curved bed, a concave bed can be used if desired. Heating means other than gas burners can be used, for example, electrical heating elements where economics or other factors so dictate. If desired, the length of the bed can be reduced as, for example, by heating the glass up close to its deformation temperature by means other than the first high float portion of the bed. Different blasthead structures can be used as can different glass loading station arrangements. Other modifications are also possible. Hence, whereas the foregoing detailed description has been chiefly related to one preferred embodiment of the invention, it will be understood that various changes and alterations may be made all within the full and intended scope of the claims which follow:

The embodiments of the invention in which an exclusive property or privilege is claimed are defined as follows:

1. An integral ceramic block for use in an apparatus for treating glass and including a first surface over which fluid may flow to maintain glass in spaced relationship thereto, a second surface, said first and second surfaces interconnected by a plurality of sides, said ceramic being of a low coefficient of thermal expansion, a plurality of discrete channels spaced throughout and communicating with said first surface and extending between and through at least one of said sides, and a first plurality of discrete passages spaced throughout said first surface among said channels and extending through the interior of said block from said first surface to said second surface.

2. An integral ceramic block as set forth in claim 1 wherein said channels include a second plurality of passages extending completely through said block between and through sides thereof and a third plurality of passages extending into said block from said first surface and communicating with said second plurality of passages.

3. An integral ceramic block as set forth in claim 2 wherein said block has four sides and wherein said second plurality of passages extend through said block between oppositely disposed first and second sides.

4. An integral ceramic block as set forth in claim 3 wherein said second plurality of passages are parallel to one another and said third plurality of passages are perpendicular to said second plurality of passages.

5. An integral ceramic block as set forth in claim 4 wherein said first plurality of passages are spaced among and parallel to said third plurality of passages.

6. An integral ceramic block as set forth in claim 5 wherein said first and second sides are substantially parallel to one another.

7. An integral ceramic block as set forth in claim 6 wherein said first surface is curved in a direction extending between said first and second sides.

8. An integral ceramic block as set forth in claim 7 wherein the third and fourth sides are substantially parallel to one another.

9. An integral ceramic block as set forth in claim 8 wherein said first plurality of passages are arranged in a plurality of rows and said third plurality of passages are arranged in a plurality of rows.

10. An apparatus for treating glass sheet comprising: a furnace; a bed supported in said furnace; means for moving glass sheet over said bed; said bed including at least one ceramic block having first and second surfaces interconnected by a plurality of sides, said ceramic being of a low coefficient of thermal expansion, a plurality of discrete discharge channels spaced throughout and communicating with said first surface and extending between and through at least one of said sides, and a first plurality of discrete inlet passages extending through the interior of said block from said first surface to said second surface and being spaced from said channels throughout said first surface; and means providing fluid flow to said passages so that fluid flows over said first surface and out said channels for supporting glass sheet on said fluid over said bed as said glass sheet is moved over said bed.

11. An apparatus as set forth in claim 10 wherein said channels include a second plurality of passages extending completely through said block between and through sides thereof and a third plurality of passages extending into said block from said first surface and communicating with said second plurality of passages.

12. An apparatus as set forth in claim 11 wherein said bed is elongated and includes a plurality of said blocks, each block having four sides with said second plurality of passages extending through each block between oppositely disposed sides, said oppositely disposed sides defining the longitudinal extremities of said bed.

References Cited
UNITED STATES PATENTS

| | | | |
|---|---|---|---|
| 2,395,727 | 2/1946 | Devol | 65—182 |
| 3,223,501 | 12/1965 | Fredley et al. | 65—25 |

DONALL H. SYLVESTER, *Primary Examiner.*

A. D. KELLOGG, *Assistant Examiner.*

UNITED STATES PATENT OFFICE

CERTIFICATE OF CORRECTION

Patent No. 3,338,697                                               August 29, 1967

Harold A. McMaster et al.

It is hereby certified that error appears in the above numbered patent requiring correction and that the said Letters Patent should read as corrected below.

Column 1, line 43, after "and" insert -- formed --; column 2, line 23, for "perculiar" read -- peculiar --; column 7, lines 52 and 55, for "uniformely", each occurrence, read -- uniformly --; column 13, line 2, after "block" insert -- section --; column 14, line 60, for "provided with perforations or air passages," read -- arcuate in form, the lower bed 70 being --; line 63, for "of" read -- or --; column 16, line 15, for "blass" read -- glass --.

Signed and sealed this 10th day of September 1968.

(SEAL)
Attest:

Edward M. Fletcher, Jr.                                    EDWARD J. BRENNER
Attesting Officer                                               Commissioner of Patents